(12) United States Patent
Chen et al.

(10) Patent No.: US 7,349,584 B2
(45) Date of Patent: Mar. 25, 2008

(54) METHOD FOR CORRECTING DISTORTIONS IN MULTI-FOCUS IMAGE STACKS

(75) Inventors: Jin Chen, Cambridge (GB); Sean Moran, Norfolk (GB); Gregory P. Davidson, Ely (GB)

(73) Assignee: Leica Micrsystems CMS GmbH, Wetzlar (DE)

( * ) Notice: Subject to any disclaimer, the term of this patent is extended or adjusted under 35 U.S.C. 154(b) by 727 days.

(21) Appl. No.: 10/985,687

(22) Filed: Nov. 10, 2004

(65) Prior Publication Data

US 2005/0100245 A1    May 12, 2005

(30) Foreign Application Priority Data

Nov. 10, 2003   (EP)   ................... 03104131

(51) Int. Cl.
  *G06K 9/32*   (2006.01)
(52) U.S. Cl. ...................................... 382/294
(58) Field of Classification Search ........ 382/294–300, 382/154, 254–55, 275–276, 128–132, 293; 348/744–747, 345–350, 79; 356/609; 250/201.2–201.3
  See application file for complete search history.

(56) References Cited

U.S. PATENT DOCUMENTS

| 6,148,120 | A | 11/2000 | Sussman |
| 6,313,452 | B1 | 11/2001 | Paragano et al. |
| 6,483,948 | B1 * | 11/2002 | Spink et al. ................. 382/255 |
| 6,693,716 | B2 * | 2/2004 | Sieckmann .................. 356/609 |
| 6,795,571 | B2 * | 9/2004 | Kusch ......................... 382/131 |

2002/0154240 A1   10/2002   Tamai et al.

FOREIGN PATENT DOCUMENTS

DE   10149357 A1   4/2002

OTHER PUBLICATIONS

Gruen, Armin W., et al., "Adaptive Least Squares Correlation with Geometrical Constraints", SPIE, vol. 595, Computer Vision for Robots (1995), pp. 72-82.
Zhang, Zhong, et al., "Image Registration for Multi-Focus Image Fusion", Proceedings of SPIE, vol. 4396 (2001), pp. 279-290.
Chen, Jin (Thesis), "The Use of Multiple Cameras and Geometric Constraints for 3-D Measurement", The City University, Department of Electrical, Electronic, and Information Engineering, Feb. 1995, pp. 1-245.

* cited by examiner

*Primary Examiner*—Ishrat Sherali
(74) *Attorney, Agent, or Firm*—Houston Eliseeva LLP

(57) ABSTRACT

A method for correcting distortions in multi-focus image stacks comprising the steps:
  acquiring a plurality of N colour images with an optical system; wherein each color image encompasses a plurality of pixels;
  converting each of two successive colour images of the N images into monochrome images;
  scaling each of the monochrome images to a conveniently M by M image;
  calculating a geometric transformation and a radiometric transformation of the two successive images, wherein the geometric transformation and the radiometric transformation is determined by a set of coefficients, which are determined by least square matching, and
  using the determined set of coefficients from each of two successive images, to correct each image sequentially and thereby constructing the multi-focus image by applying the determined parameter set to each of the successive images.

11 Claims, 7 Drawing Sheets

METHOD FOR CORRECTING DISTORTIONS IN MULTI-FOCUS IMAGE STACKS

RELATED APPLICATIONS

This application claims priority of the European patent application 03 104 131.2 which is incorporated by reference herein.

FIELD OF THE INVENTION

The invention concerns a method for correcting distortions in multi-focus image stacks.

BACKGROUND OF THE INVENTION

Several methods for three-dimensional reconstruction of surfaces of microscopic structures are known. In CLSM (confocal laser scanning microscopy) the specimen is scanned point by point in one plane, and an image with very little depth of focus is thereby acquired. With a plurality of images in different planes, and by way of appropriate image processing, the specimen can be depicted three-dimensionally. In CLSM the data can be generated only in very expensive fashion, and high-quality optical components are a prerequisite. A high level of technical complexity is also necessary in another technique in which a 3D reconstruction is achieved by means of a thin line of light directed onto the surface that is to be reconstructed.

Chen J. mentiones in his PhD thesis, City University, UK. February, 1995, "The Use of Multiple Cameras and Geometric Constraints for 3-D measurement".

The German Patent Application DE 101 49 357 discloses a method and an apparatus for optical measurement of a surface profile of a specimen. A series of n images of the specimen being acquired with an image acquisition apparatus in different planes in the z direction of a coordinate system (x, y, z). The image contents of all n images of the resulting image stack are compared to each other in the z direction at each coordinate point (x, y) in order to determine a plane therefrom according to predetermined criteria, assign its plane number (N) to that coordinate point (x, y), and store it in a mask image. The mask image contains all the 3D data of the specimen surface. Processing can be performed using 2D image processing procedures. The 3D information can be quickly and easily retrieved from the mask image. The surface profile can be reconstructed and displayed three-dimensionally. The disclosed system does not include any correction of distortions in multi-focus image stacks.

The U.S. Pat. No. 6,148,120 uses image processing to alter the spatial relationship in one or more focal images in order to ensure geometric correspondence between the images. The image processing is composed of two fundamental processes: mapping and resampling. In mapping, the spatial relationship between the input image coordinates and the processed (output) image coordinates is established. In resampling, image value interpolated from pixels from the input image are written to corresponding locations in the output image according to the mapping. The prior art relies on exact knowledge of geometry compared with proposed method, wherein the correction is determined by matching adjacent images. Additionally, no correction for radiometric variations from layer to layer is disclosed or mentioned.

The U.S. Pat. No. 6,313,452 discloses a microscopy system utilizing a plurality of images for enhanced image processing capabilities. The microscopy system comprising a microscope including a stage, at least one magnifying lens, and a lens controller, a video capture device coupled to the microscope capturing a plurality of images of an object on the stage of the microscope and a processing subsystem receiving the plurality of images from the video capture device, in which the processing subsystem generates at least one resultant image as a function of the plurality of images. The at least one resultant image generated by the processing subsystem may include a mosaic, submosaic or a sequence of mosaics. The system is not capable in talking multifocus images.

SUMMARY OF THE INVENTION

It is the object of the invention to provide a method for the correction of distortions in multifocus image stacks and provide a distortion free image of a sample. The distortions originate from the non-telecentric optics of stereo microscopes or of other optical systems as the object to lens distance is changed.

The above object is accomplished by a method for correcting distortions in multi-focus image stacks comprising the steps:
  acquiring a plurality of N colour images with an optical system; wherein each color image encompasses a plurality of pixels;
  converting each of two successive colour images of the N images into monochrome images;
  scaling each of the monochrome images to a conveniently M by M image;
  calculating a geometric transformation and a radiometric transformation of the two successive images, wherein the geometric transformation and the radiometric transformation is determined by a set of coefficients, which are determined by least square matching, and
  using the determined set of coefficients from each of two successive images, to correct each image sequentially and thereby constructing the multi-focus image by applying the determined parameter set to each of the successive images.

It is advantageous that the method of the present invention acquires in a first step a plurality of N colour images with an optical system. Each colour image encompasses a plurality of pixels and differs form the preceding or succeeding one by its focus position. In a second step a converting of each of two successive colour images of the N images into monochrome images is carried out. In a third step a scaling of each of the monochrome images to a conveniently M by M image is accomplished. A fourth step and a fifth step are carried out in parallel. The fourth step calculates a geometric transformation and the fifth step calculates a radiometric transformation of the two successive images. The geometric transformation and the radiometric transformation is determined by a set of coefficients, which are determined by least square matching, which is done in a sixth step. A seventh step uses the determined set of coefficients from each of two successive images, to correct each image sequentially and thereby constructing the multi-focus image by applying the determined parameter set to each of the successive images.

The plurality of N color images are acquired with the optical system, wherein a preceding image and a succeeding image differs in their focal position. The determined set of coefficients edges of the image are chopped off, wherein the image has invalid image data based on the obtained determined coefficients. The scaling of the image is a bilinear interpolation which combines contributions from four pixels in the greyscale image to determine each pixel in the data reduced image. The scaled image has a standard image size of typically 128 by 128 bits. A geometric transformation is accomplished with least square template matching for eight geometric coefficients and a radiometric transformation is accomplished with least square template matching for two radiometric coefficients. The plurality of sequential N image is read in real time by a camera or are retrieved from a memory of the control unit or from a computer and a validation check and memory initialisation is carried out. Both geometric transformation and radiometric transformation are combined into one least square matching calculation and generate a generalised formula. The geometric transformation and the radiometric transformation is applied sequentially to each two consecutive image pairs for sequential image mapping.

BRIEF DESCRIPTION OF THE DRAWINGS

The invention will be explained in more detail below with reference to the exemplary embodiments depicted in the drawings, in which, schematically in each case.

DETAILED DESCRIPTION OF THE INVENTION

Figure 1:
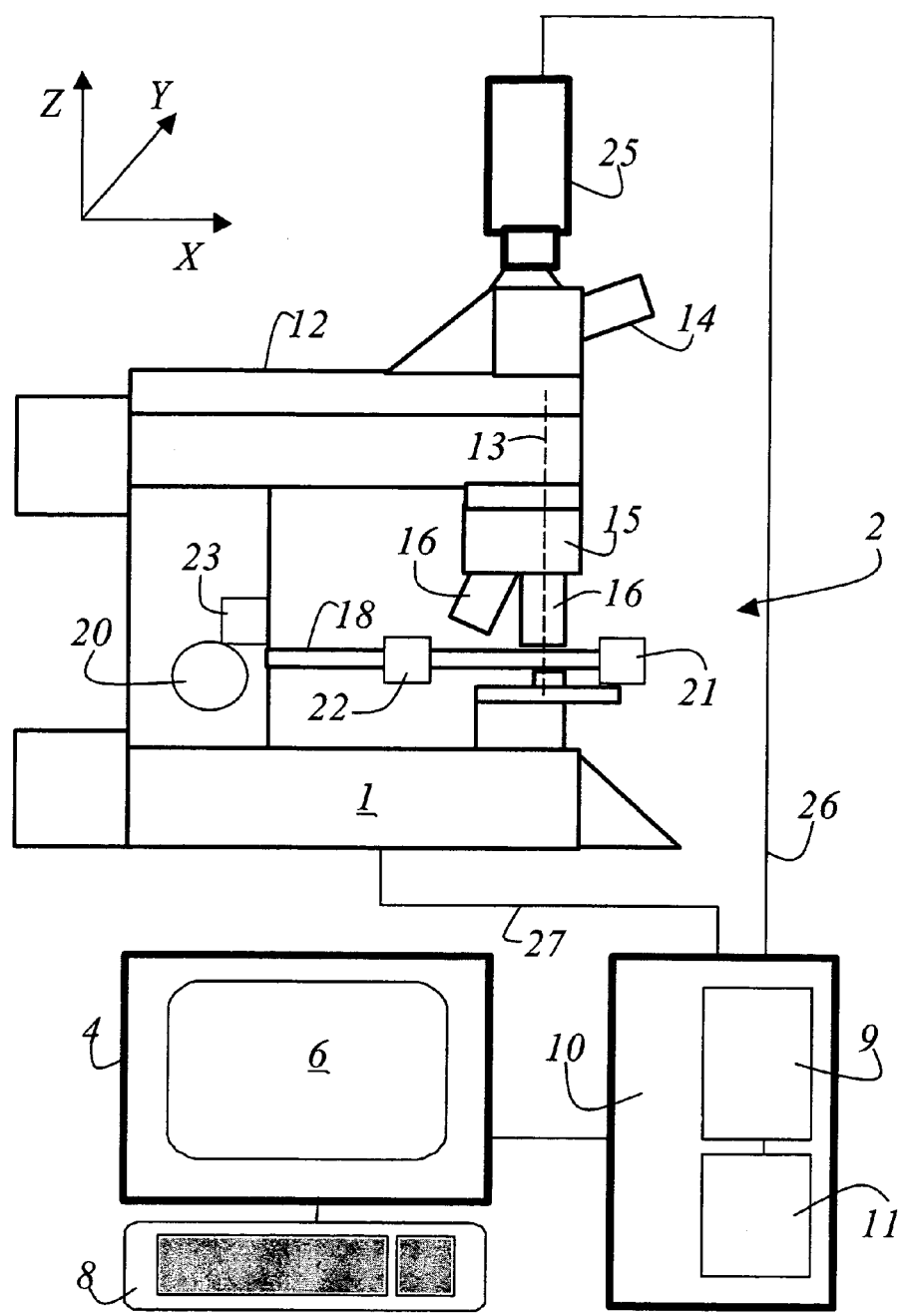
FIG. 1 is a schematic view of an optical system for acquiring multi-focus image stacks.

FIG. 1 is a schematic view of an optical system 2 for acquiring multifocus image stacks. The embodiment featured here shows a microscope 1, to which a computer 4 with a display 6 and an input device 8, as well as a control unit 10, for controlling and monitoring the various microscope functions are provided. The control unit encompasses a memory 9 and a microprocessor 11. The memory 9 and the microprocessor 11 are utilized by the method for correcting distortions in multi-focus image stacks. It is obvious to any person skilled in the art of correcting distortions in multi-focus image stacks, that the microscope can be a inverted microscope or a stereo microscope as well. The graphical description of the optical system 2 as shown in FIG. 1 should not limit the scope of the invention. The microscope 1 has a stand 12, to which at least one ocular 14, at least one objective 16 and a microscope stage 18 are attached. The embodiment shown in FIG. 1 has a microscope stage 18 can be displaced in a three directions of an orthogonal coordinate system. In order to to obtain multi-focus image stacks a relative motion has to take place between the sample on the stage 18 and the objective 16. The relative motion is in the direction of the optical axis of the optical system 2. In the embodiment shown here, the microscope 1 has a turret 15 to which at least one objective 16 is mounted. At least one objective 16 is in the operating position and thereby defines an optical axis 13 (shown in dashed lines). Additionally, a focussing knob 20 is provided on both sides of the stand 12. The focussing knob 20 is used to adjust the height of the microscope stage 18 relative to the objective 16. The microscope stage 18 of the microscope 1 is movable with a first motor 21 along the X-Axis X, with a second motor 22 along the Y-axis Y and with a third motor 23 along the Z-axis Z. The first motor 21, second motor 22 and third motor 23 are actuated by the control unit 10. A camera 25 is mounted at the microscope 1. The camera records an image of the sample, which is taken by the objective 16 in the working position. An electric cable 26 connects the camera and the control unit 10. The control unit 10 is connected by at least a second electric cable 27 with the microscope 1. The camera 25 may be configured as a video-camera or a CCD-camera. Usually the beam paths of compound microscopes, as shown in FIG. 1, are telecentric, that is to say the magnification in the focus plane and in out-of-focus planes remains the same. Nevertheless, there micrcoscopes which do fulfil the telecentric prerequisite, so that the invention applies here as well.

Figure 2:
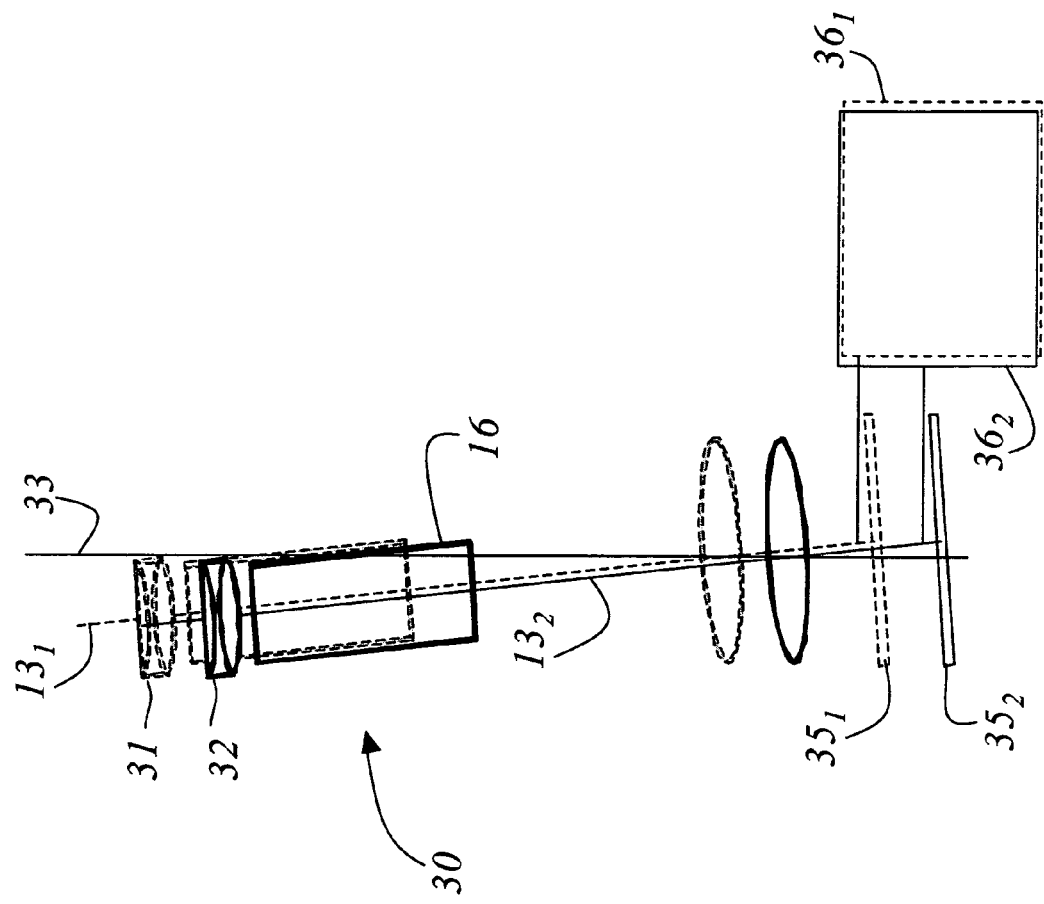
FIG. 2 is a disposition of a partial view of a stereomicroscope in a first position and a second position such that it has been translated along an axis that is not parallel with the optical axis of the microscope.

FIG. 2 shows a disposition of a partial view of a stereomicroscope 30 in a first position 31 and a second position 32 such that it has been translated along an axis 33 that is not parallel with the optical axis 13 of the stereomicroscope 30. For the sake of clarity several part of the stereomicroscope 30 are not shown. The parts are for example: the stand 12, the control unit 10, the camera 25, the stage 18 etc. In FIG. 2 dashed lines indicate the first position 31 of the objective 16. Solid lines indicate the second position 32 of the objective. The effect of the translation form the first position 31 to the second position 32 is to move the optical axis 13 of the stereomicroscope from a first position $13_1$ to a second position $13_2$ which captures images from the sample in the in-focus regions $35_1$ and $35_2$ respectively. The resulting first image $36_1$ has a displacement compared to the resulting second image $36_2$. The displacement results from the translation along the axis 33 together with other distortions resulting from mechanical and optical effects. A purpose of this invention is to correct the distortion between successive pairs of images in a series of images by finding the parameters of transformations that will bring successive pairs of images back into a proper alignment.

Stereo microscopes use non-telecentric optics. There are several consequences of this design that affect the fidelity of multifocus images or image stacks. There are as well several issues that affect the fidelity of multifocus images or image stacks generated with compound microscopes.

A Lateral fine adjustment is necessary to compensate for a lateral displacement of successive images. Mechanical imperfections of the microscope or stereo microscope may cause laterally displacement of a single image in the image stack or introduce systematic progressive displacement through the image stack. Therefore it might be necessary to check the lateral adjustments by auto-correlation or least squares matching and to line up the images before generating the final image or image stack.

The convergence angle causes asymmetrical out-of-focus blur. Automated MultiFocus generates excellent images with extended depth of field with all microscopes where the axis of the observation beam path and the movement axis of the focus drive are identical. This is the case for compound microscopes but not for stereomicroscopes except for those fitted with the AX microscope carriers. Therefore, it is advantageous to consider also the convergence angle of stereomicroscopes to reduce the asymmetrical out-of-focus blur. In this case the user should be able to enter the convergence angle and the direction of the observation beam path if not automatically detected by auto-correlation or least squares matching. The convergence angle and/or the automatically detected convergence angle are entered into the control unit 10.

Telecentric and non-telecentric beam paths may require correction as well. Usually the beam paths of compound microscopes are telecentric, that is to say the magnification in the focus plane and in out-of-focus planes remains the same. This is not the case for stereomicroscopes. Therefore, it is necessary to make fine adjustment to the size of each single image before combining them to the final image. The amount of resizing should be found automatically by auto-correlation or least squares matching.

These required corrections are necessary in order to obtain a multifocus image. A sequential tracking based on least squares matching (LSM) has been developed to overcome the problems described above. The LSM template matching is based on pairs of successive sequential images from the image stack. The sequential LSM template matching has been successfully applied to dynamic and accurate image location in multi-focus image stacks.

The LSM template based image matching can, in this stereo microscope image stack case, supply higher location accuracy and correct the various error caused by non-telecentric optics in compound microscopes and stereo microscopes. The developed method is especially suitable for long sequential image stacks in which two successive images have very similar image background textures.

The following explains the principle steps in processing. For simplicity it is shown as two separate loops which may be realised in a variety of implementations that can take advantage of the availability of intermediate results to avoid unnecessary storage and retrieval of data.

A sequential image stack (N images) is read. The N images are read in real time by the camera or are retrieved from the memory 9 of the control unit 10 or from the computer 4. Then a validation check and memory initialisation is carried out. In a first loop for each two successive images of the N images, the colour images are converted into monochrome images by for example:

$$P_{RGB}(x,y) \rightarrow P_R(x,y), P_G(x,y), P_B(x,y)$$

$$P_{mono}(x,y)=(P_R(x,y)+P_G(x,y)+P_B(x,y))/3$$

In a next step the monochrome images $P_{mono}$ are converted into conveniently sized M by M images by scaling (described below in paragraph 1.1) and bilinear interpolation (described below in paragraph 1.2). A typical value for M might be 128.

$$P_{ScalingDown}(x_{new},y_{new})=A_{ScalingDown} P_{mono}(x,y),$$
where

Wherein:

$$P_{ScalingDown} = \begin{bmatrix} x_{new} \\ y_{new} \\ 1 \end{bmatrix}$$

-continued $$A_{ScalingDown} = \begin{bmatrix} S_x & 0 & 0 \\ 0 & S_y & 0 \\ 0 & 0 & 1 \end{bmatrix}$$

$$S_x = M/X_{resolution}, S_y = M/Y_{resolution}$$

$$P_{mono} = \begin{bmatrix} x \\ y \\ 1 \end{bmatrix}$$

In a following step a geometric transformation $A_{geometry}$ of the two successive images has to be calculated (described below in paragraph 1.3), where $$A_{geometry} = \begin{bmatrix} P_0 & P_1 & P_2 \\ P_3 & P_4 & P_5 \\ 0 & 0 & 1 \end{bmatrix}$$

$$A_{radiometry} = [P_6, P_7]$$

The calculation of $P_0 \ldots P_7$ is described in next section.

This least square matching parameter set is saved into least square matching parameter stack.

Figure 3:
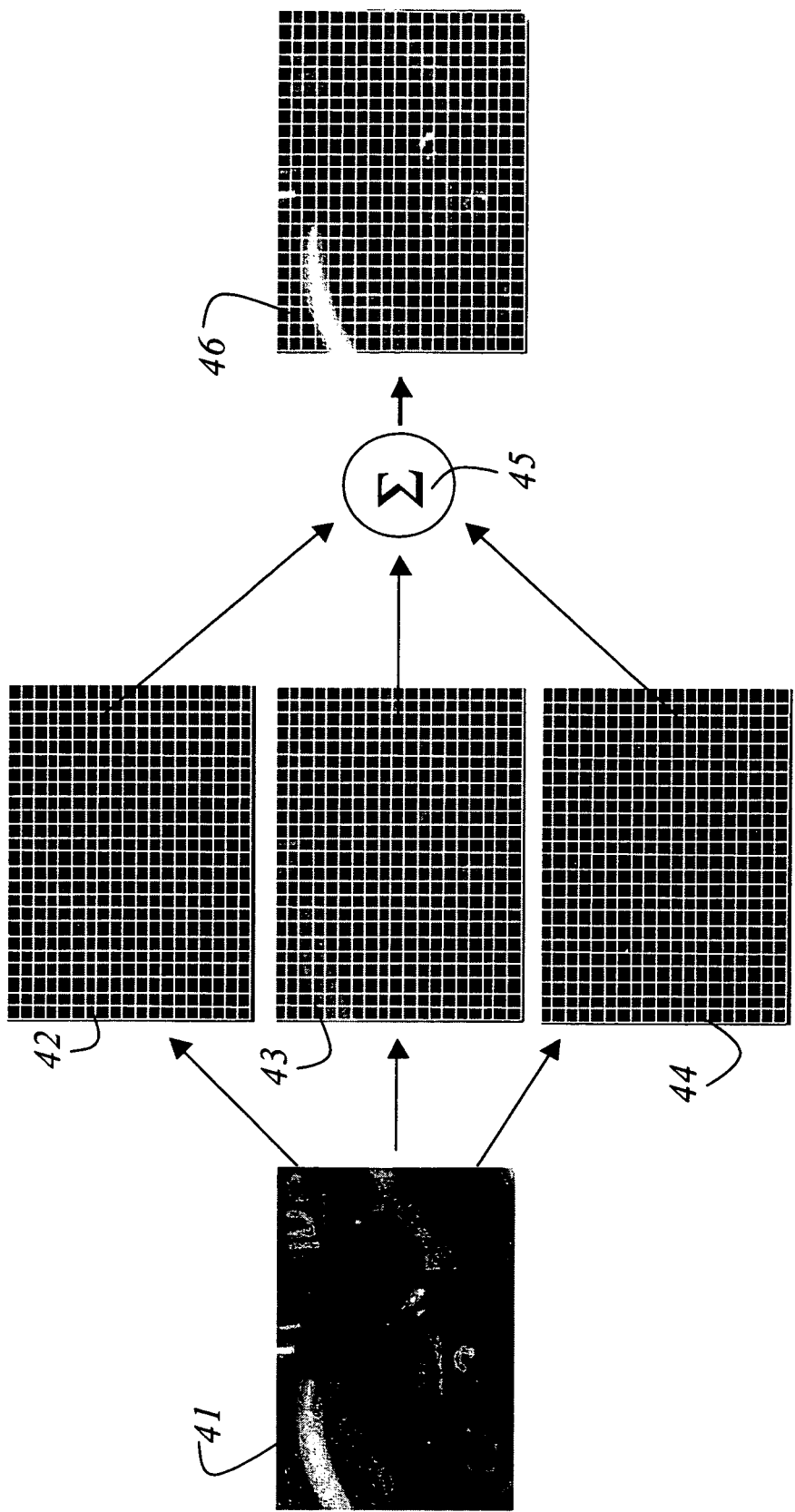
FIG. 3 is a graphical presentation of the process of generating a greyscale representation of overall intensities in the image from a colour image.

FIG. 3 is a graphical presentation of the process of generating a greyscale representation of overall intensities in the image from a colour image 41. A colour image 41 captured by the camera 25 is separated into three components of a red image 42, a green image 43 and a blue image 44. The data of the separated red image 42, green image 43 and blue image 44 are combined by a linear operation 45 to produce a greyscale representation 46 of overall intensities in the image.

After the loop one, a valid range for the images is worked out, which is carried out by the x and y shift parameters in the least square matching parameter stack ($x_{low}$, $y_{low}$, $x_{upper}$, $y_{upper}$).

In loop two each single image of the N images is calculated:

$$P_{Rresult}(x,y)=A P_R(x,y)$$

$$P_{Gresult}(x,y)=A P_G(x,y)$$

$$P_{Bresult}(x,y)=A P_B(x,y)$$

$$P_{Rresult}(x,y), P_{Gresult}(x,y), P_{Bresult}(x,y) \rightarrow P_{RGB}(x,y)$$

The process of calculation is described in paragraph 1.4.

$$A=A_{ScalingDown} A_{geometry} A_{ScalingUp}$$

As $A_{ScalingUp} = \begin{bmatrix} 1/S_x & 0 & 0 \\ 0 & 1/S_y & 0 \\ 0 & 0 & 1 \end{bmatrix}$ Therefore -continued $$A = \begin{bmatrix} P_0 & (S_x/S_y)P_1 & S_xP_2 \\ (S_y/S_x)P_3 & P_4 & S_yP_5 \\ 0 & 0 & 1 \end{bmatrix}$$

Radiometric transformation:

$A_{radiometry} = [P_6, P_7]$

Therefore, $P_{RGB}(x,y) = P_6 + P_7 * P_{RGB}(x,y)$

After the image based on the rectangle ($x_{low}$, $y_{low}$, $x_{upper}$, $y_{upper}$) is chopped off, one gets a valid correct image. The multi-focus algorithm, as disclosed in the German Patent Appl. DE 101 49 351, is used to obtain a final multi-focus image.

The underlying theory of the proposed process is described below. The scaling, the bilinear interpolation and the least square matching is described in detail.

1.1 Scaling:

Scaling is necessary particular for large size image data. Typically, the image size is 2048×1536×24 bits which is about 9 Mbytes for each image. It is computationally impractical to apply LSM template match on such a large image size. Therefore, a scaling down is applied to reduce the large image size to a smaller image size. Another consequence of this scaling is the reduction of high frequency noise in the image.

Figure 4:
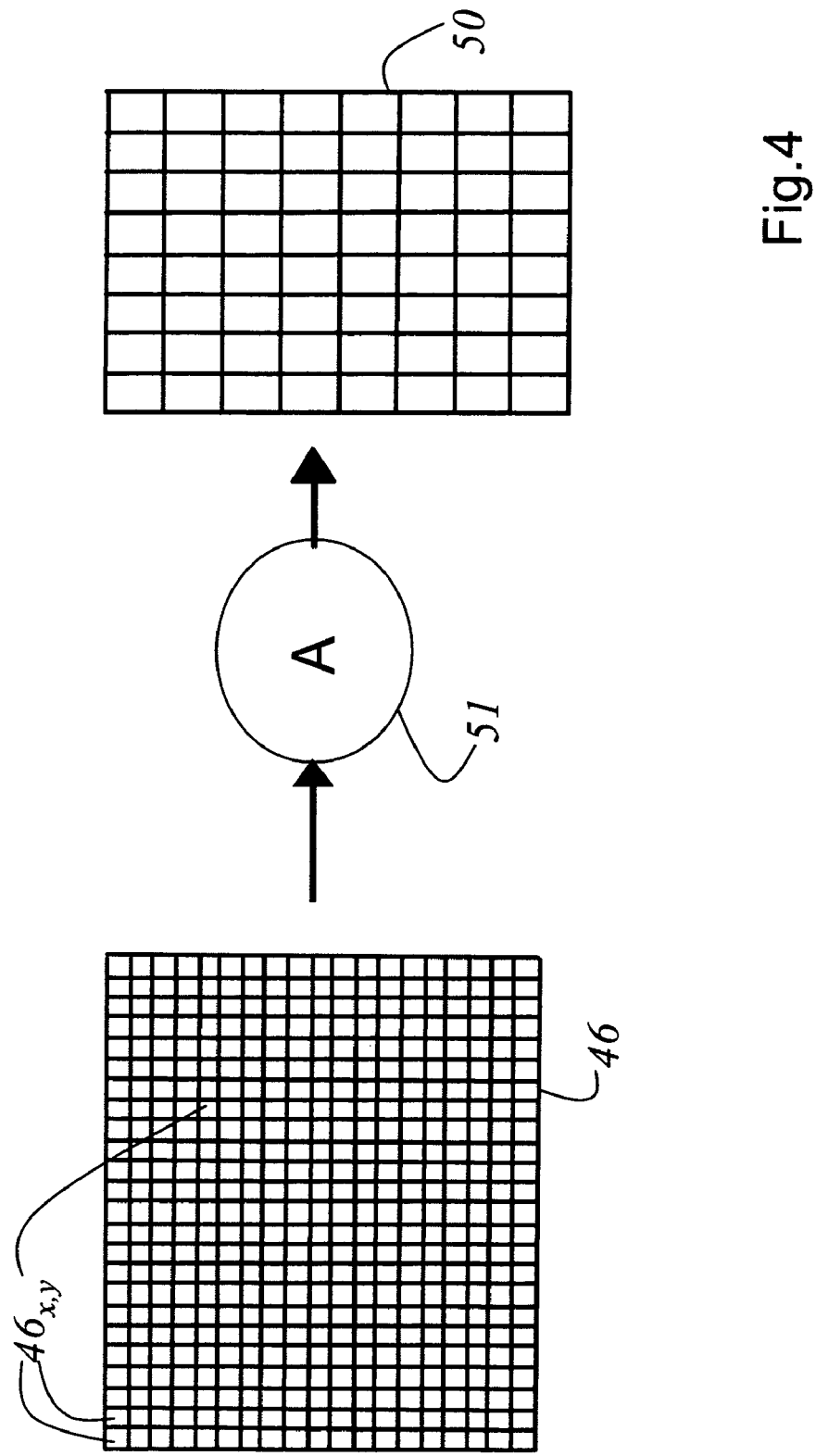
FIG. 4 is a representation of a data reduced image that maps the pixels of the greyscale image onto a generally smaller square region for purposes of computational efficiency.

FIG. 4 is a representation of a data reduced image 50 that maps the pixels $46_{x,y}$ of the greyscale image 46 onto a generally smaller square region for purposes of computational efficiency. A mapping is calculated that transforms the greyscale image 46 into a data reduced image 50 essentially by finding a rescaling matrix 51 that maps the pixels of the greyscale image 46 onto a generally smaller square region of the reduced image 50 for purposes of computational efficiency and the reduction of noise in the image. A bilinear interpolation combines contributions from four pixels in the greyscale image 46 to determine each pixel in the data reduced image 50.

The scaling down includes two parts: convert colour image into monochrome, greyscale image 46; and scaling down to a uniform monochrome image size, typically 128×128 although other sizes are possible given sufficient computational resource. A 128×128 scaled image is used in this example.

A colour image is converted into monochrome image: one method simply applies an average the R, G, B component of a RGB image to get a greyscale image intensity value of each pixel as follows:

$P_{RGB}(x,y) \rightarrow P_R(x,y), P_G(x,y), P_B(x,y)$ $P_{mono}(x,y) = (P_R(x,y) + P_G(x,y) + P_B(x,y))/3$ Other methods of conversion of colour image to monochrome are possible without affecting the efficacy of the method. For example this following example preserves luminance $P_{mono}(x,y) = 0.30 * P_R(x,y) + 0.59 * P_G(x,y) + 0.11 * P_B(x,y)$ An image consisting of the a number of monochrome images each acquired at a different wavelength is treated in like manner by a suitable linear combination of the intensities of the separate components. The method applies to any such combination and for images of any bitdepth.

To scale an image down to 128×128 scaling factors on both x and y direction should be applied. The calculation of x and y scaling factor is based on:

$S_x = 128/X$resolution $S_y = 128/Y$resolution

To maintain accuracy during scaling, a bilinear interpolation algorithm is applied.

1.2 Bilinear Interpolation

Figure 5:
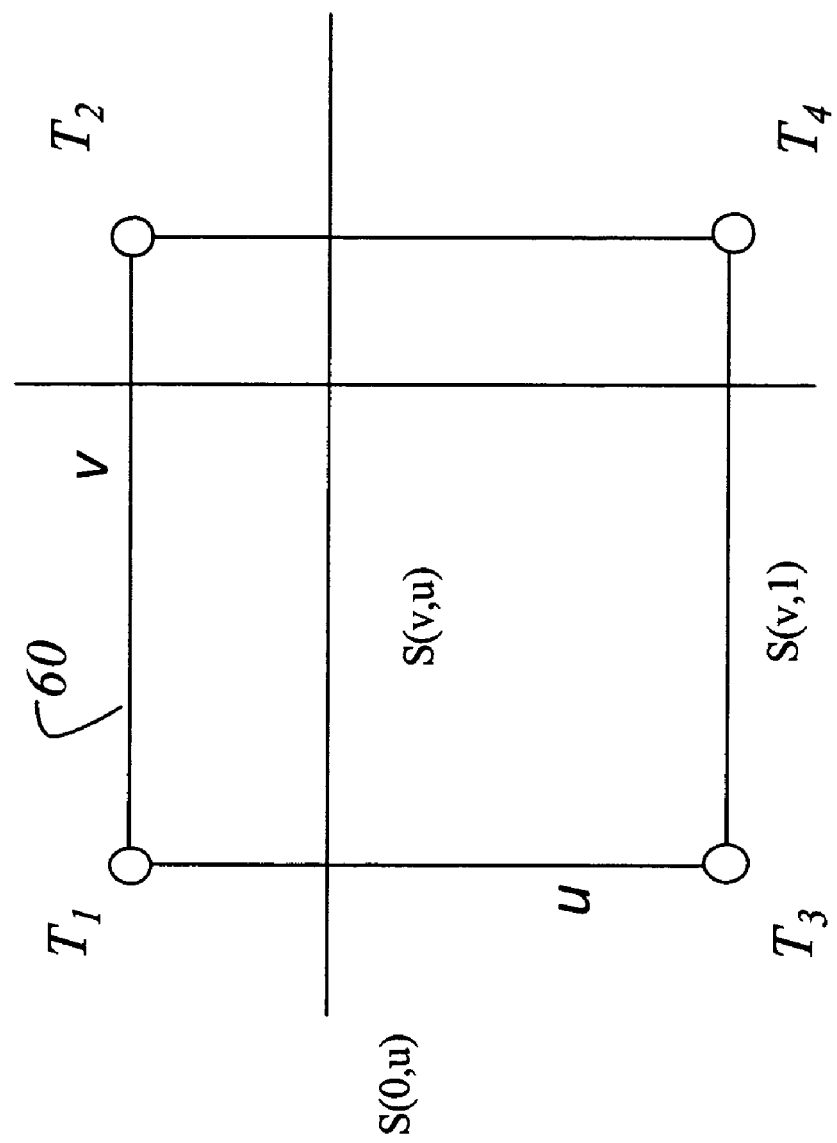
FIG. 5 is a graphical representation of a bilinear interpolation method.

In the bilinear interpolation method (see FIG. 5), a grid surface 60 is described by the following form of vector equation:

$S(v,u) = T_1(1-u)(1-v) + T_2(1-u)v + T_3u(1-v) + T_4uv$

Where $0 \leq u$, $v \leq 1$ and $S(v,u)$ is the grid point and $P_1$, $P_2$, $P_3$, $P_4$ are four neighboring points at which the values are respectively $T_1$, $T_2$, $T_3$, and $T_4$.

$S(v,u)$ is the resulted pixel by scaling and it is a decimal pixel size represented by u and v. The task is to calculate the u and v based on the four neighbour points so that the value of the interpolated grid point can be computed. It can be seen that $S(0,0) = T_1$, $S(1,0) = T_2$, and so on. Also $S(v,1)$ is the line segment joining points $P_3$ and $P_4$, $S(0,u)$ is the line segment joining points $P_1$ and $P_3$, and so on. As the surface is a quadrilateral plane, the value of the surface with respect to u and v can be found by solving the quadratic equation. Rewriting the vector equation as:

$x = x_1(1-u)(1-v) + x_2(1-u)v + x_3u(1-v) + x_4uv$ $y = y_1(1-u)(1-v) + y_2(1-u)v + y_3u(1-v) + y_4uv$ where x, y are the co-ordinates of the grid point and $x_1 \ldots x_4$, $y_1 \ldots y_4$ are co-ordinates of the four neighbour points respectively. Using the above equations, the new intensity in the outcome image can be computed by applying the data into the equations.

1.3 Least Square Matching

Figure 6:
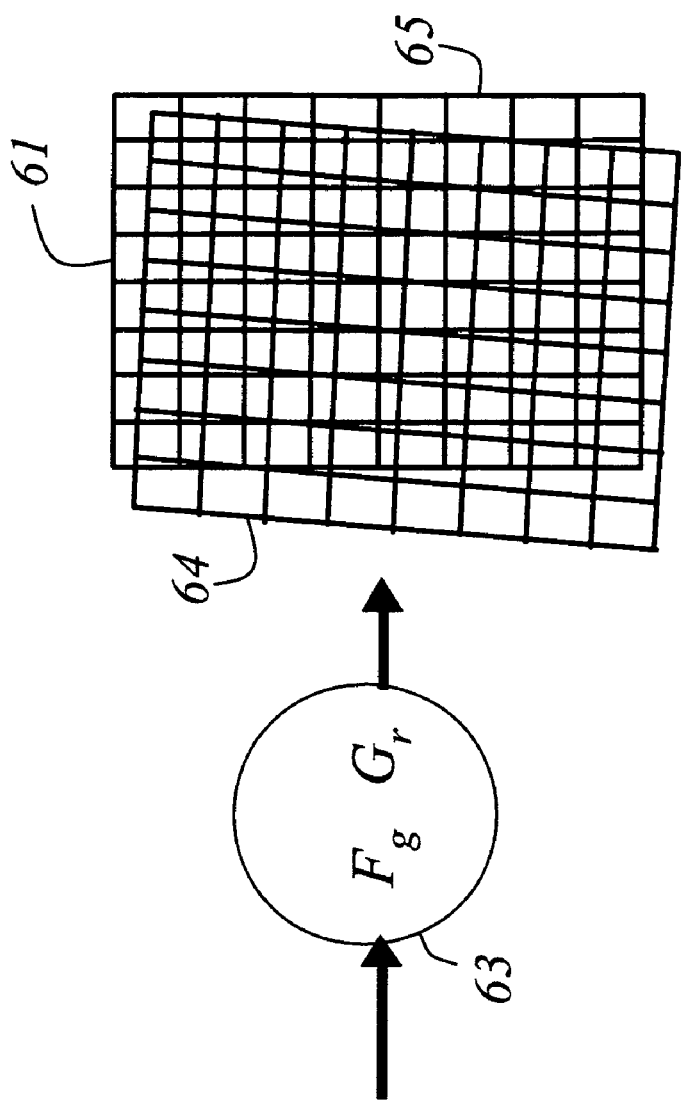
FIG. 6 is a representation of generalised linear transformation in order to map a first region onto a second region wherein the first region incorporates rotation magnification shearing and translation on two axes.

FIG. 6 is a representation of a generalised linear transformation in order to map a first region 61 onto a second region 64 wherein the first region incorporates rotation magnification shearing and translation on two axes A generalised linear transformation 63 will map the first region 61 onto the second region 64. Wherein the transformation incorporates rotation magnification shearing and translation on two axes. This is the geometric transformation $F_g$ which is described in more detail below. At the same time a radiometric transformation $G_r$ is carried out, which affects the brightness of each pixel by a scaling and offset. The whole of this transformation can be described by eight parameters, which are determined by the present invention. According to that the similarity of the transformed region 64 to a reference region 65 is maximised, by using an iterative method of least squares to minimise the greyscale difference between the transformed region 64 and the reference region 65. In this way the eight parameters needed for the realignment of each pair of image planes can progressively be determined, and these parameters then used to correct the original data.

There are two main factors responsible for the distortions from image to image in the sequential images of a stereo microscope image stack: these are, as mentioned before, a geometric distortion and a radiometric distortion. To achieve unambiguous matches and high accuracy results, both geometric and radiometric factors have be considered. The geometric and radiometric distortion exist in the image stack but are unknown. For the purpose of compensating for these distortions and improving matching accuracy, the least squares matching (LSM) method is applied. LSM is the approach in which the optimum match is defined by a transformation of one array into another which minimizes the remaining grey value differences. The forward straight least squares solution minimizes the residual differences between the grey values of the pairs of corresponding points between two images, thus representing the demanded optimum transformation which gives the optimal matching. In this method, the geometric differences can be modelled by an affine transformation, while the radiometric differences are modelled by an additive and a multiplicative parameter. The main purpose for the single point LSM is to refine the approximate matching position(s) and to get subpixel accuracy. The derived method is described as follows.

Assuming $I_1(x, y)$ to be the reference image template and $I_2(x, y)$ to be the actual image patch, then the mapping between the two images can be expressed as:

$$I_2(x_2, y_2) = G_r(F_g(I_1(x_1, y_1)))$$

Where $F_g$ is geometric co-ordinate transformation, i.e.

$$F_g(x', y') = I_1(x_1, y_1)$$

And $G_r$ is intensity or radiometric transformation, i.e.

$$G_r(x'', y'') = F_g(x', y')$$

And the actual image patch $I_2(x_2, y_2)$ is the geometric and radiometric transformations of the reference image template $I_1(x_1, y_1)$, i.e.

$$I_2(x_2, y_2) = G_r(x'', y'')$$

This basic algorithm can be formulated in the following two generalized radiometric and geometric equations respectively.

For the radiometric transformation:

$$I_2(x_2, y_2) = G_r(x'', y'')$$

However, the effects of noise in the actual image have to be considered, the above equation becomes:

$$I_2(x,y) - G_r(x,y) = n(x,y)$$

where
$I_2(x,y)$ is the grey level function of the actual image,
$G_r(x,y)$ is the template image, and.
$n(x,y)$ error vector.
Therefore $$I_2(x, y) - n(x, y) = G_r^0(x, y) + \frac{\partial G_r^0(x, y)}{\partial x}d_x + \frac{\partial G_r^0(x, y)}{\partial y}d_y$$

where:

$$\frac{\partial G_r^0(x, y)}{\partial x}d_x$$

is the gradient in the x direction, and $$\frac{\partial G_r^0(x, y)}{\partial y}d_y$$

is the gradient in the y direction which can be declared as $G_x$, $G_y$.

For the geometric transformation:

$$G_r(x'', y'') = F_g(x', y')$$

When consider the effects of noise in the actual image, the above equation becomes:

$$G_r(x,y) - F_g(x,y) = v(x,y)$$

where
$G_r(x,y)$ is the geometric level function of the target,
$F_g(x,y)$ is the search windows and
$v(x,y)$ is the error vector.
Therefore $$G_r(x, y) - v(x, y) = F_g^0(x, y) + \frac{\partial F_g^0(x, y)}{\partial x}d_x + \frac{\partial F_g^0(x, y)}{\partial y}d_y$$

where $$\frac{\partial F_g}{\partial x}$$

is the gradient in the x direction and $$\frac{\partial F_g}{\partial y}$$

is the gradient in the y direction, which can be declared as $F_x$, $F_y$.

The geometric transformation is represented by an affine transformation, including translation, rotation, and scaling, i.e.

$$x' = p_0 + p_1 x_1 + p_2 y_1$$

$$y' = p_3 + p_4 x_1 + p_5 y_1$$

The radiometric transformation is represented by a linear transformation including intensity scaling and shift, i.e.

$$I_2(x_2, y_2) = p_6 + p_7 * F_g(x', y')$$

Combined the above both radiometric and geometric transformation, in the implementation, both the radiometric quality and the geometrical differences are considered and the two equations above can be written as:

$$I_2(x,y) = p_6 + p_7 * F_g(p_0 + p_1 x + p_2 y, p_3 + p_4 x + p_5 y)$$

So, the generalised observation equation can be obtained by linearising the above equation:

$$I_2(x_i,y_j) - n(x_i,y_j) = G^0(x_i,y_j) + G^0_{P_6}(x_i,y_j)dp_6 + G^0_{P_7}(x_i,y_j)dp_7$$

$$G_r(x_i,y_j) - v(x_i,y_j) = F^0(x_i,y_j) + F^0_{P_0}(x_i,y_j)dp_0 + F^0_{P_1}(x_i,y_j)dp_1 + F^0_{P_2}(x_i,y_j)dp_2 + F^0_{P_3}(x_i,y_j)dp_3 + F^0_{P_4}(x_i,y_j)dp_4 + F^0_{P_5}(x_i,y_j)dp_5$$

where
$p_0$, $p_1$, $p_2$, $p_3$, $p_4$, $p_5$ are unknown coefficients for geometric transformation, and
$p_6$, $p_7$ are unknown coefficients for radiometric correction $$F^0_{p_0}(x_i,y_j) = 1$$

$$F^0_{p_1}(x_i,y_j) = x_i$$

$$F^0_{p_2}(x_i,y_j) = y_j$$

$F^0_{p_3}(x_i,y_j)=1$ $F^0_{p_4}(x_i,y_j)=x_i$ $F^0_{p_5}(x_i,y_j)=y_j$ $G^0_{p_6}(x_i,y_j)=1$ $G^0_{p_7}(x_i,y_j)=F_g^0(p_0+p_1x_i+p_2y_j,p_3+p_4x_i+p_5y_j)$

Let $P_A=[p_0, p_1, p_2, p_3, p_4, p_5, p_6, p_7]^T$ $x=p_0+p_1X+p_2Y$ $y=p_3+p_4X+p_5Y$ $i=p_6+p_7I_1(x,y)$ $x_1$, $y_1$, and $I_1(x_1, y_1)$ are co-ordinates and intensity value of the reference template image; $x_2$, $y_2$, and $I_2(x_2, y_2)$ are co-ordinates and intensity value for ideal location and intensity in the actual image. The eight coefficients of $p_0 \ldots p_7$, can be worked out by least squares matching.

$P_A=(A^TWA)^{-1}A^Tx$ where $A^T$ is the transpose matrix of A, which is 3n×8 matrix, n is the total pixel number of the template image.

$$P_A = \begin{bmatrix} p_0 \\ p_1 \\ \ldots \\ p_7 \end{bmatrix}$$

$$A^T = \begin{bmatrix} 1 & x_1 & y_1 & 0 & 0 & 0 & 0 & 0 \\ 0 & 0 & 0 & 1 & x_1 & y_1 & 0 & 0 \\ 0 & 0 & 0 & 0 & 0 & 0 & 1 & I_1(x_1,y_1) \\ \ldots & \ldots & \ldots & \ldots & \ldots & \ldots & \ldots & \ldots \\ 1 & x_n & y_n & 0 & 0 & 0 & 0 & 0 \\ 0 & 0 & 0 & 1 & x_n & y_n & 0 & 0 \\ 0 & 0 & 0 & 0 & 0 & 0 & 0 & I_1(x_n,y_n) \end{bmatrix}$$

and

W is a weight matrix, usually taken as the covariance matrix.

$$\underline{x} = \begin{bmatrix} X_1 \\ Y_1 \\ I_1(X_1, Y_1) \\ \ldots \\ Xn \\ Yn \\ I_1(Xn, Yn) \end{bmatrix}$$

$$W = \begin{bmatrix} q/q_1 & 0 & \ldots & 0 \\ 0 & q/q_2 & \ldots & 0 \\ \ldots & \ldots & \ldots & \ldots \\ 0 & 0 & \ldots & q/q_{3n} \end{bmatrix}$$

Where q is the global variance, and $q_i$ (i=1, 2 . . . , 3n) is the local variance.

This least square matching is done in an iterative way, where the initial value of $P_A^0$ is:

$$P_A^0 = \begin{bmatrix} 1 \\ 0 \\ 0 \\ 1 \\ 0 \\ 0 \\ 0 \\ 1 \end{bmatrix}$$

Figure 7:
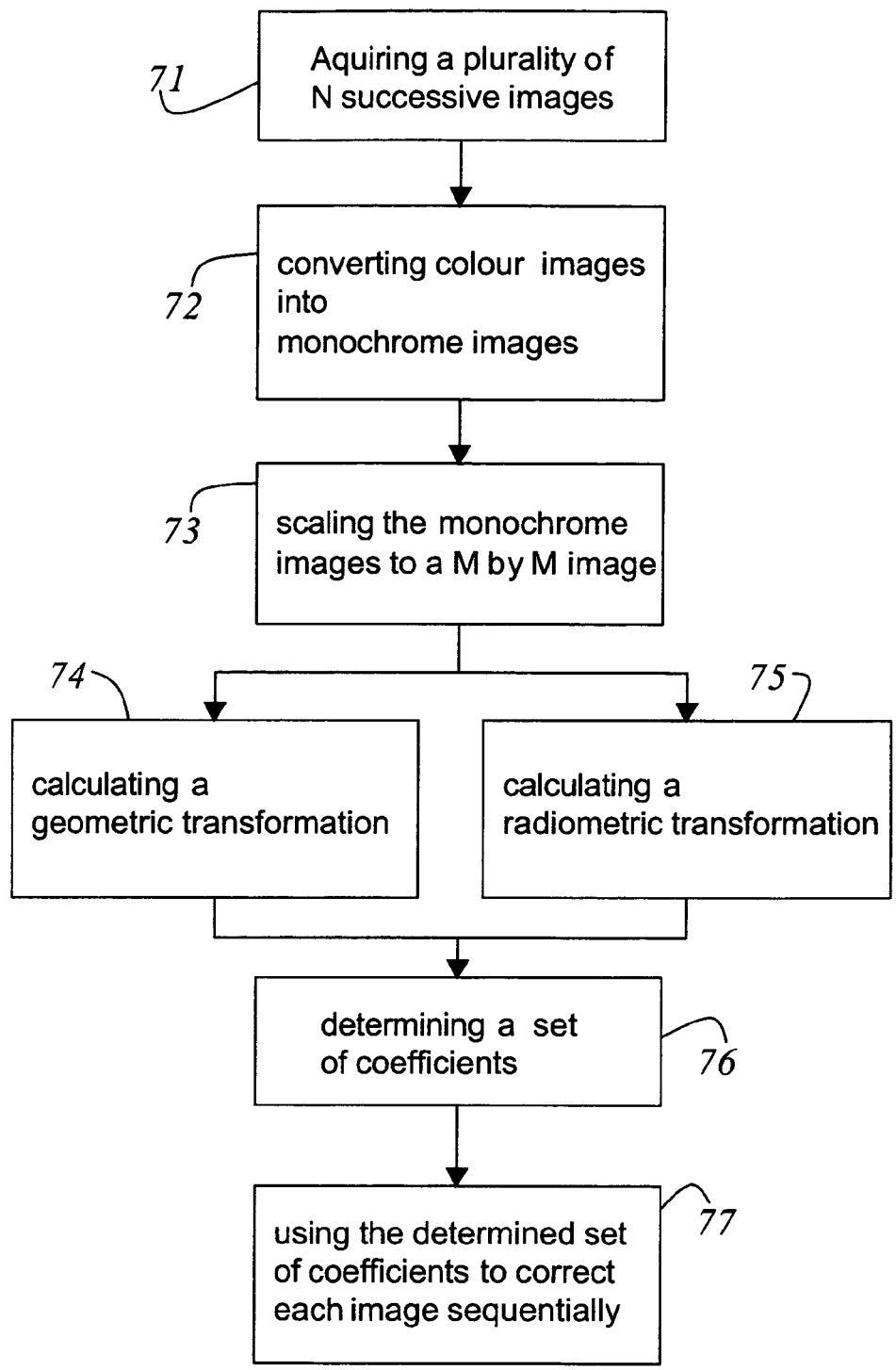
FIG. 7 is a flowchart of the inventive process.

FIG. 7 shows a flowchart of the method for correcting distortions in multi-focus image stacks. In a first step 71 a plurality of N colour images are aquired with an optical system. Each colour image encompasses a plurality of pixels and differs from the preceding or succeeding one by its focus position. In a second step 72 a converting of each of two successive colour images of the N images into monochrome images is carried out. In a third step 73 a scaling of each of the monochrome images to a conveniently M by M image is accomplished. A fourth step 74 and a fifth step 75 are carried out in parallel. The fourth step 74 calculates a geometric transformation and the fifth step 75 calculates a radiometric transformation of the two successive images. The geometric transformation and the radiometric transformation is determined by a set of coefficients, which are determined by least square matching, which is done in a sixth step 76. A seventh step 77 uses the determined set of coefficients from each of two successive images, to correct each image sequentially and thereby constructing the multi-focus image by applying the determined parameter set to each of the successive images.

The determined set of coefficients edges of the image are chopped of, wherein these image edges have invalid image data based on the obtained determined coefficients. The scaling (third step 73) of the image is a bilinear interpolation which combines contributions from four pixels in the grey-scale image 46 to determine each pixel in the data reduced image 50.

What is claimed is:

1. A method for correcting distortions in multi-focus image stacks comprising the steps:
    acquiring a plurality of N colour images with an optical system; wherein each color image encompasses a plurality of pixels;
    converting each of two successive colour images of the N images into monochrome images;
    scaling each of the monochrome images to a conveniently M by M image;
    calculating a geometric transformation and a radiometric transformation of the two successive images, wherein the geometric transformation and the radiometric transformation is determined by a set of coefficients, which are determined by least square matching, and
    using the determined set of coefficients from each of two successive images, to correct each image sequentially and thereby constructing the multi-focus image by applying the determined parameter set to each of the successive images.

2. The method as defined in claim 1 wherein the plurality of N colour images are acquired with the optical system in that a preceding image and a succeeding image differs in their focal position.

3. The method as defined in claim 1 wherein according to the determined set of coefficients edges of the image are chopped off, wherein the image has invalid image data based on the obtained determined coefficients.

4. The method as defined in claim 1 wherein the scaling of the image is a bilinear interpolation which combines contributions from four pixels in the greyscale image to determine each pixel in the data reduced image.

5. The method as defined in claim 4 wherein scaled image has a standard image size of typically 128 by 128 bits.

6. The method as defined in claim 1 wherein a geometric transformation is accomplished with least square template matching for eight geometric coefficients and a radiometric transformation is accomplished with least square template matching for two radiometric coefficients.

7. The method as defined in claim 1 wherein the plurality of sequential N image is read in real time by a camera or are retrieved from a memory of the control unit or from a computer and a validation check and memory initialisation is carried out.

8. The method as defined in claim 1 wherein the geometric transformation incorporates rotation magnification shearing and translation on two axes and wherein the radiometric transformation affects the brightness of each pixel by a scaling and offset.

9. The method as defined in claim 8, wherein the geometric transformation and the radiometric transformation are carried out at the same time.

10. The method as defined in claim 1, wherein both geometric transformation and radiometric transformation are combined into one least square matching calculation and generate a generalised formula.

11. The method as defined in claim 10 wherein, the geometric transformation and the radiometric transformation is applied sequentially to each two consecutive image pair for sequential image mapping.

* * * * *

UNITED STATES PATENT AND TRADEMARK OFFICE
CERTIFICATE OF CORRECTION

PATENT NO. : 7,349,584 B2
APPLICATION NO. : 10/985687
DATED : March 25, 2008
INVENTOR(S) : Jin Chen et al.

It is certified that error appears in the above-identified patent and that said Letters Patent is hereby corrected as shown below:

On the Title Page Item (73) Assignee, change "Leica Micrsystems CMS GmbH" to --Leica Microsystems CMS GmbH--.

Signed and Sealed this

First Day of July, 2008

JON W. DUDAS
*Director of the United States Patent and Trademark Office*